US006730904B1

(12) United States Patent
Wells

(10) Patent No.: US 6,730,904 B1
(45) Date of Patent: May 4, 2004

(54) ASYMMETRIC-FIELD ION GUIDING DEVICES

(75) Inventor: Gregory J. Wells, Fairfield, CA (US)

(73) Assignee: Varian, Inc., Palo Alto, CA (US)

( * ) Notice: Subject to any disclaimer, the term of this patent is extended or adjusted under 35 U.S.C. 154(b) by 0 days.

(21) Appl. No.: 10/426,542

(22) Filed: Apr. 30, 2003

(51) Int. Cl.$^7$ .......................... H01J 49/42; B01D 59/44
(52) U.S. Cl. ....................................... 250/292; 250/288
(58) Field of Search ................................ 250/288, 281, 250/292, 282, 287

(56) References Cited

U.S. PATENT DOCUMENTS 4,963,735 A 10/1990 Okamoto et al.
5,179,278 A 1/1993 Douglas
5,248,875 A 9/1993 Douglas et al.
5,750,993 A 5/1998 Bier
5,847,386 A 12/1998 Thomson et al.
6,111,250 A 8/2000 Thomson et al.
6,417,511 B1 * 7/2002 Russ et al. .................. 250/292
6,576,898 B2 * 6/2003 Waki .......................... 250/292
6,642,514 B2 * 11/2003 Bateman et al. ............ 250/288

* cited by examiner

*Primary Examiner*—John H. Lee
*Assistant Examiner*—Johnnie L Smith, II
(74) *Attorney, Agent, or Firm*—Andrei Popovici; Bella Fishman

(57) ABSTRACT

An electrodynamic ion guide for a mass spectrometer comprises multiple sections having different guiding field central axes. At least one of the guiding fields can be an asymmetric guiding field having a quadrupole component and a dipole component. The ion guide can be positioned in a guide chamber with the first field central axis facing an inlet aperture and the second field central axis facing an outlet aperture. The ion guide allows the efficient use of a guide chamber with no line of sight from the inlet aperture to the outlet aperture, such that undesired liquid droplets entering the guide chamber through the inlet aperture do not exit through the outlet aperture. In the preferred embodiment, the ion guide comprises a plurality of longitudinally-concatenated, progressively narrowing segments, each segment including four flat plates arranged symmetrically about a central geometric axis.

34 Claims, 16 Drawing Sheets

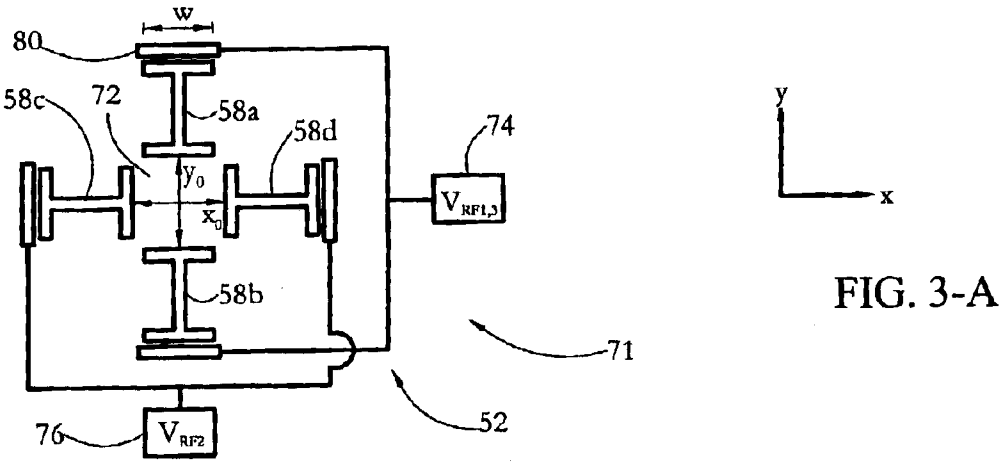
FIG. 3-A
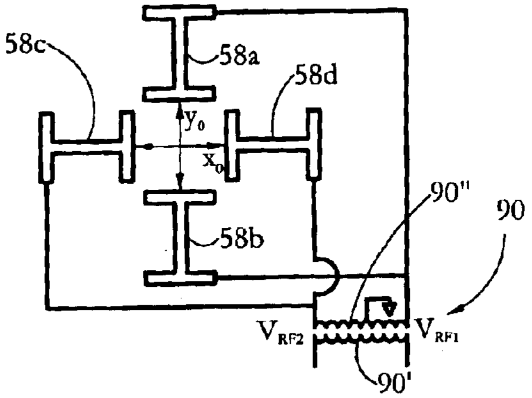
FIG. 3-B
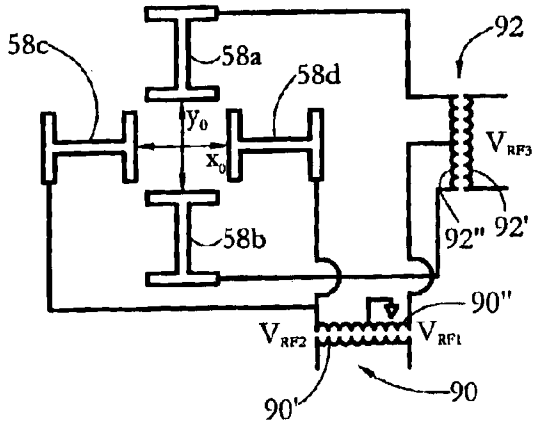
FIG. 3-C

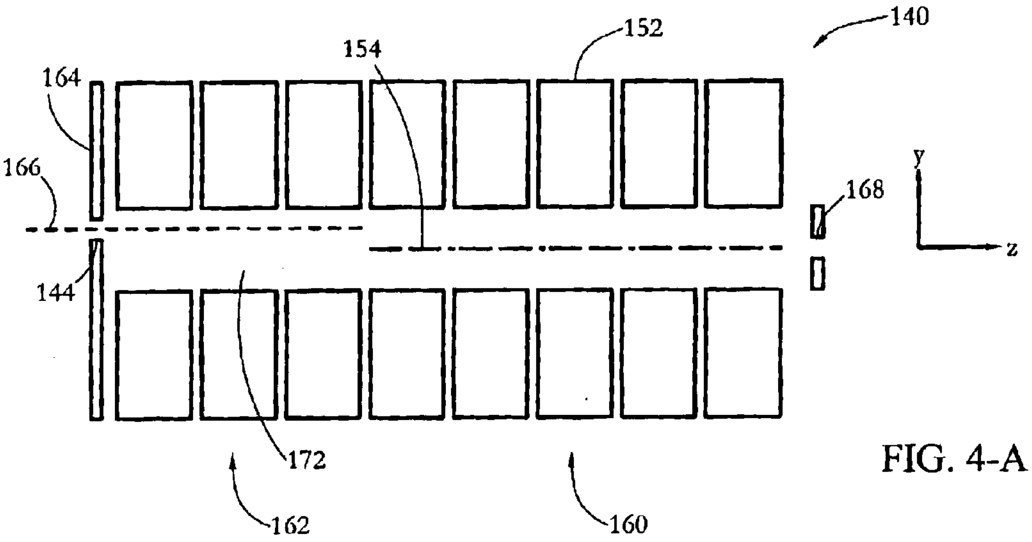
FIG. 4-A
FIG. 4-B
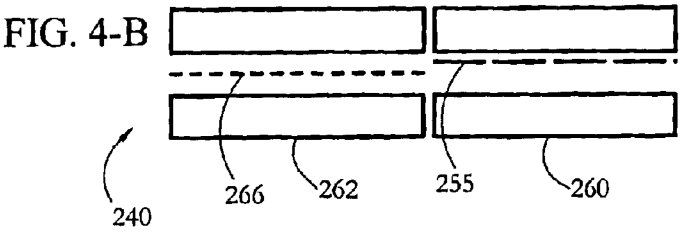
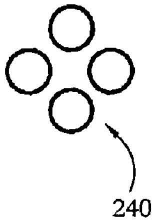
FIG. 4-C
FIG. 4-D
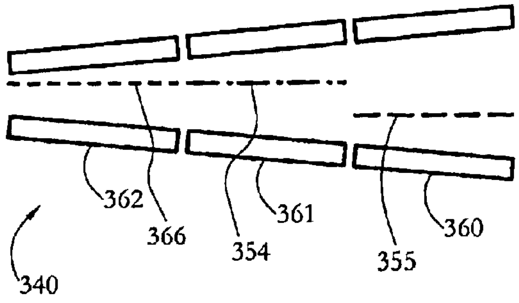

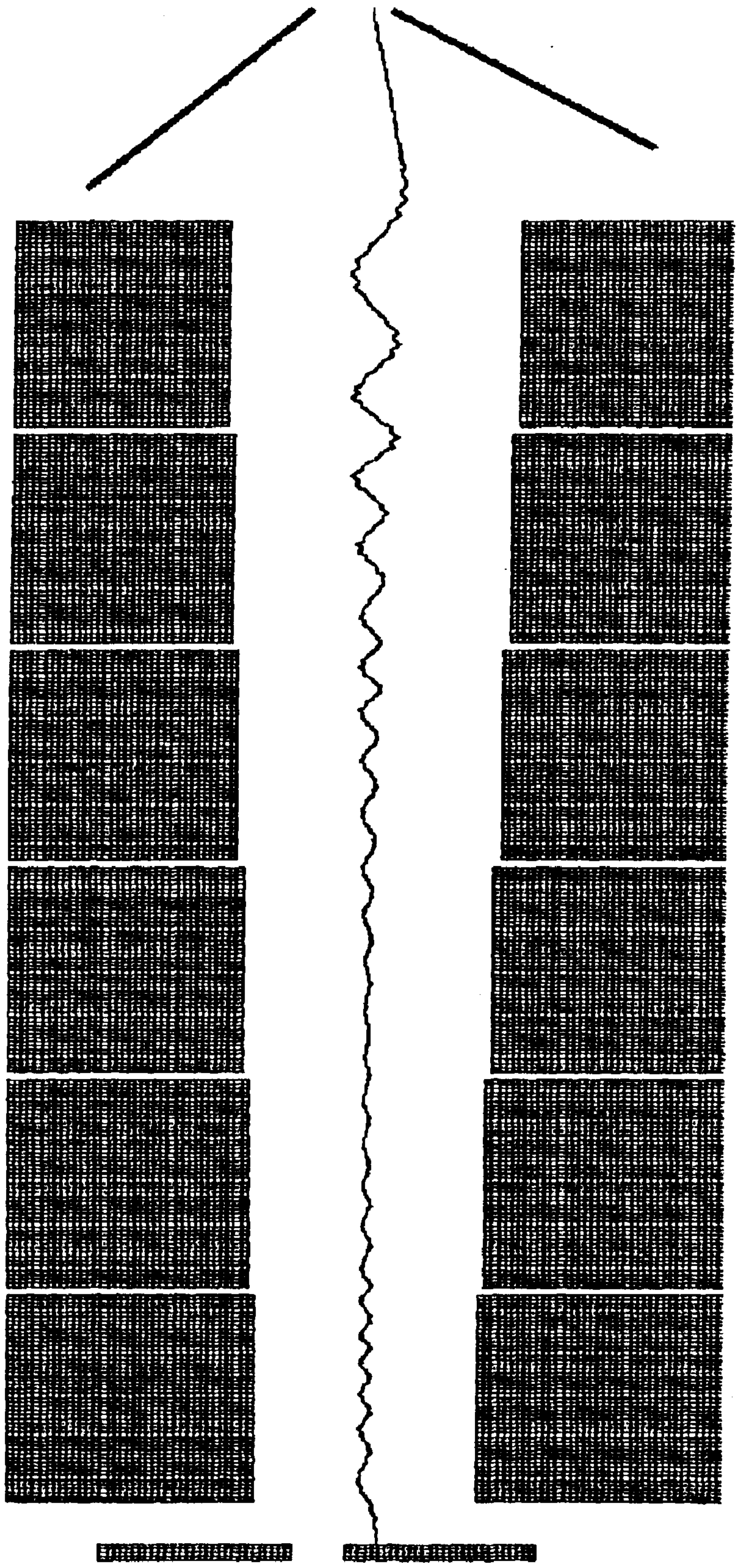
FIG. 5-A

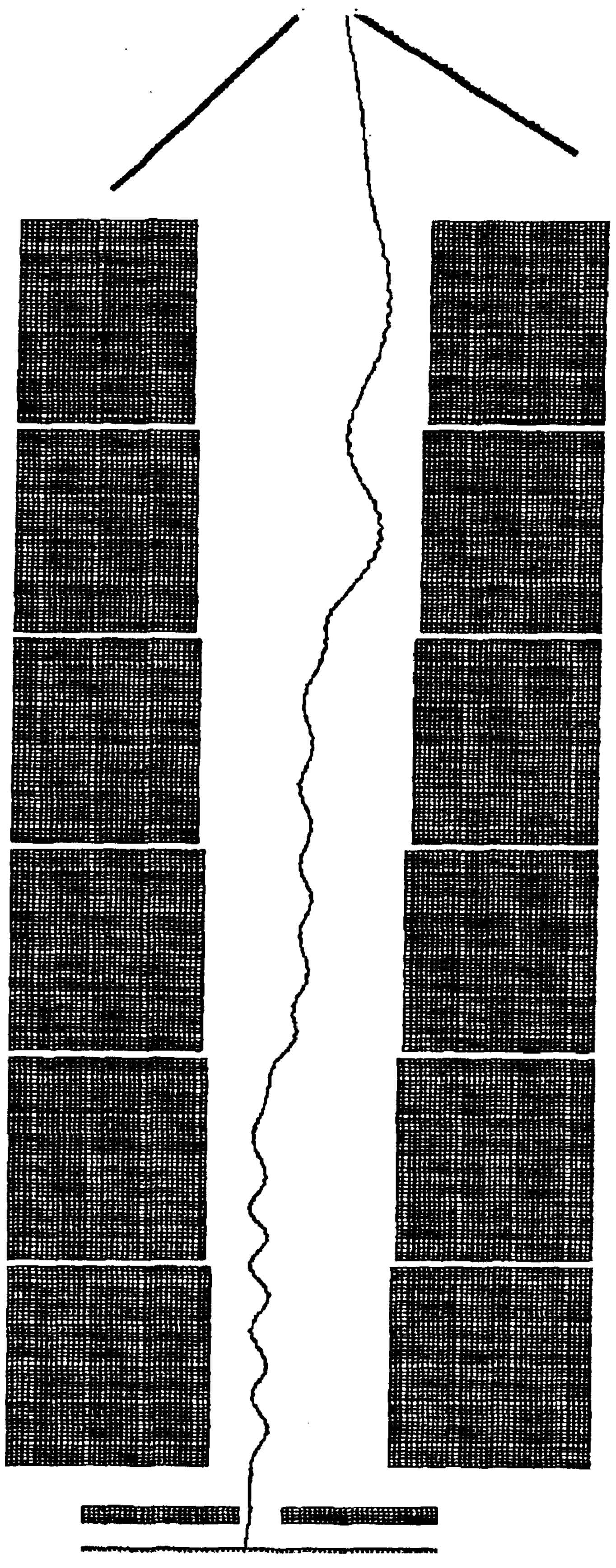
FIG. 5-B

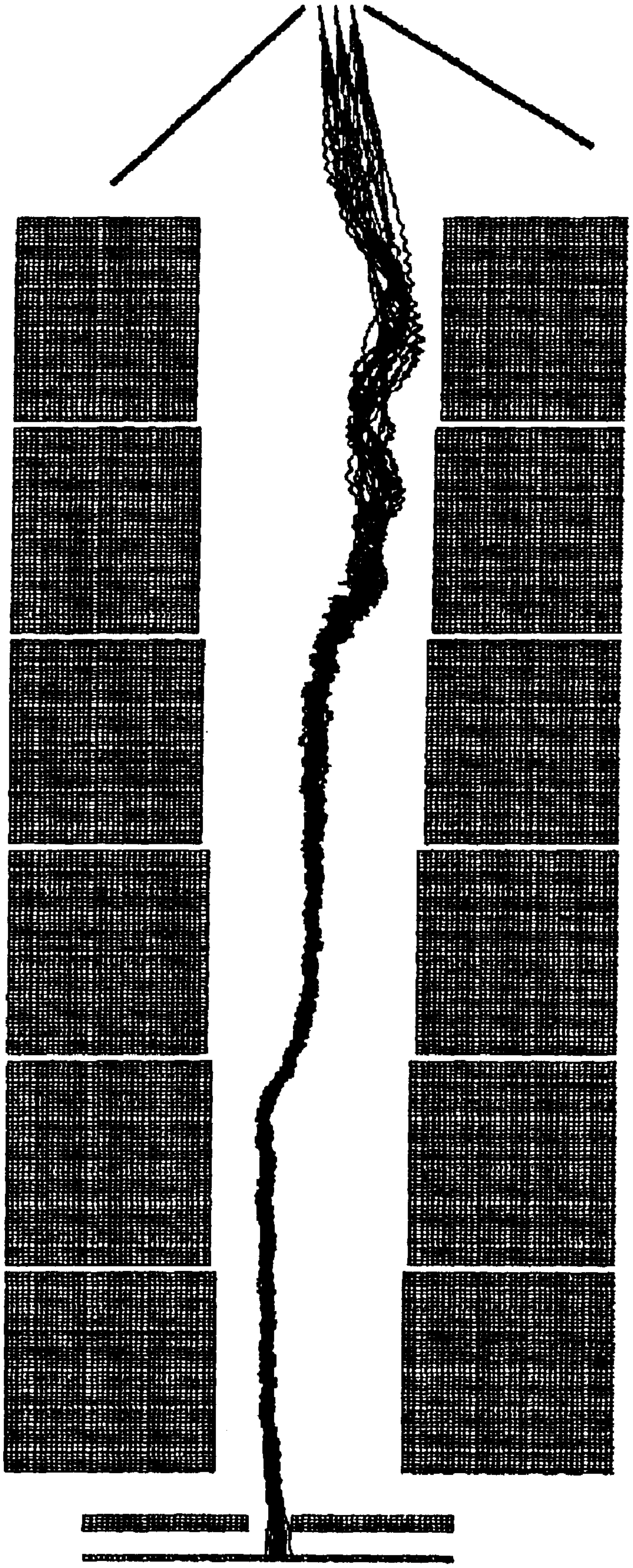
FIG. 5-C

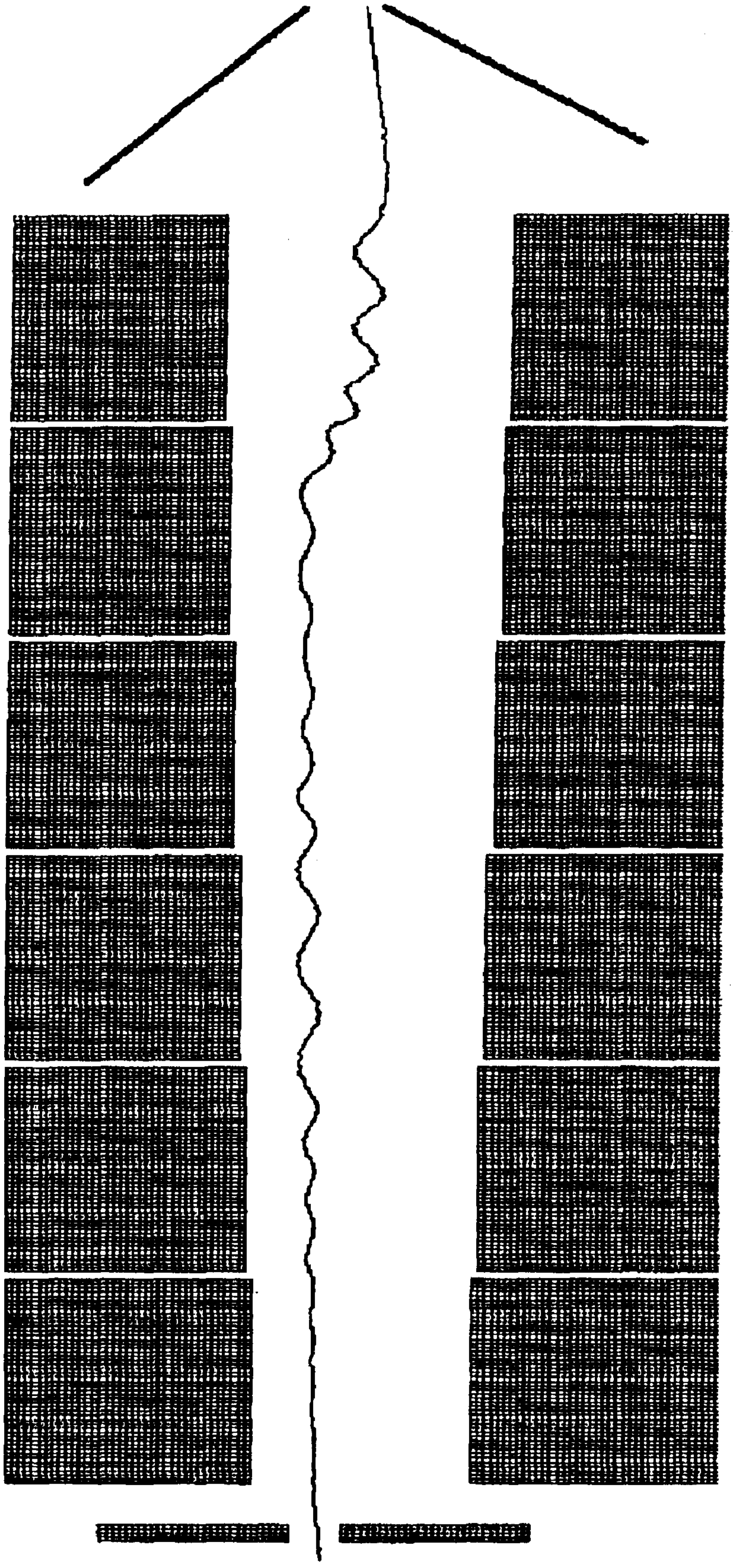
FIG. 5-D

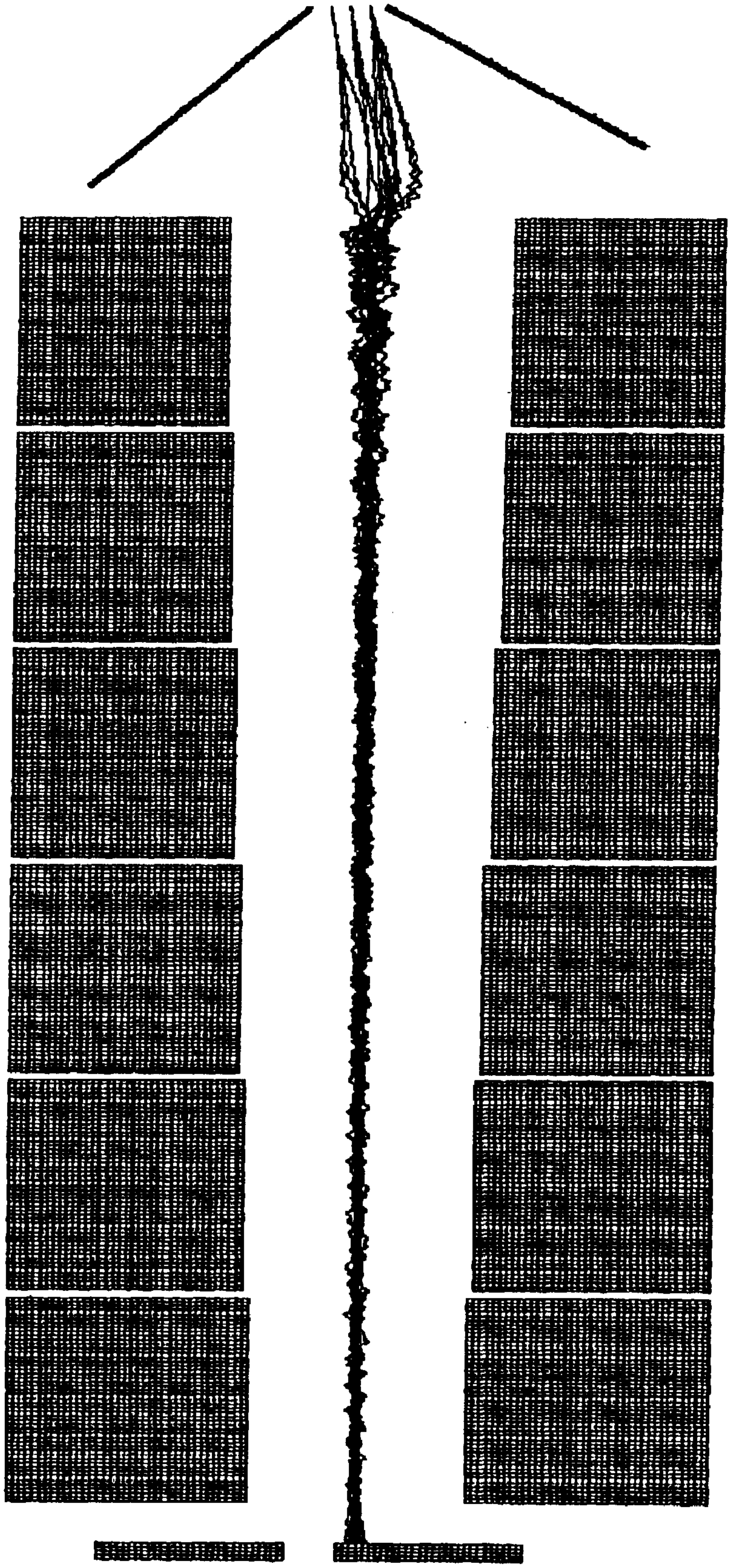
FIG. 5-E

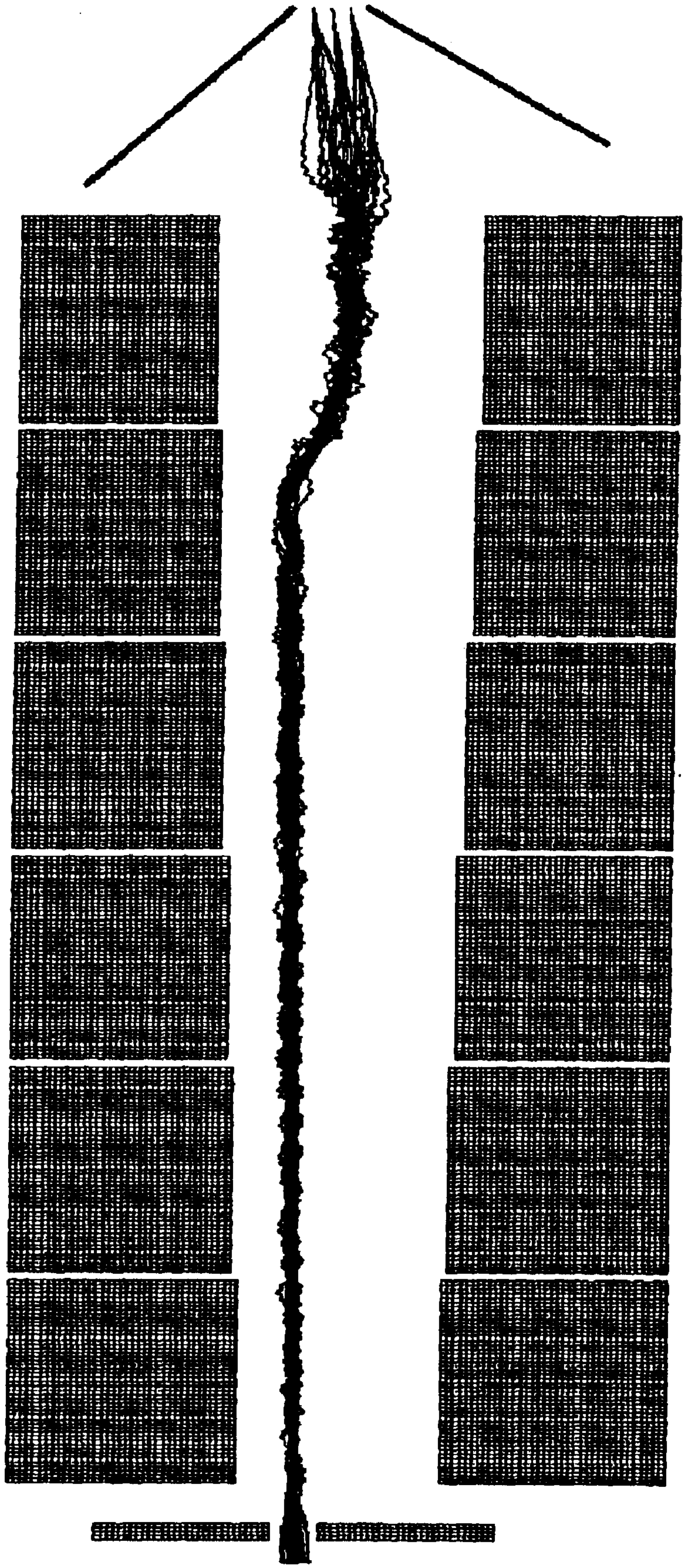
FIG. 5-F

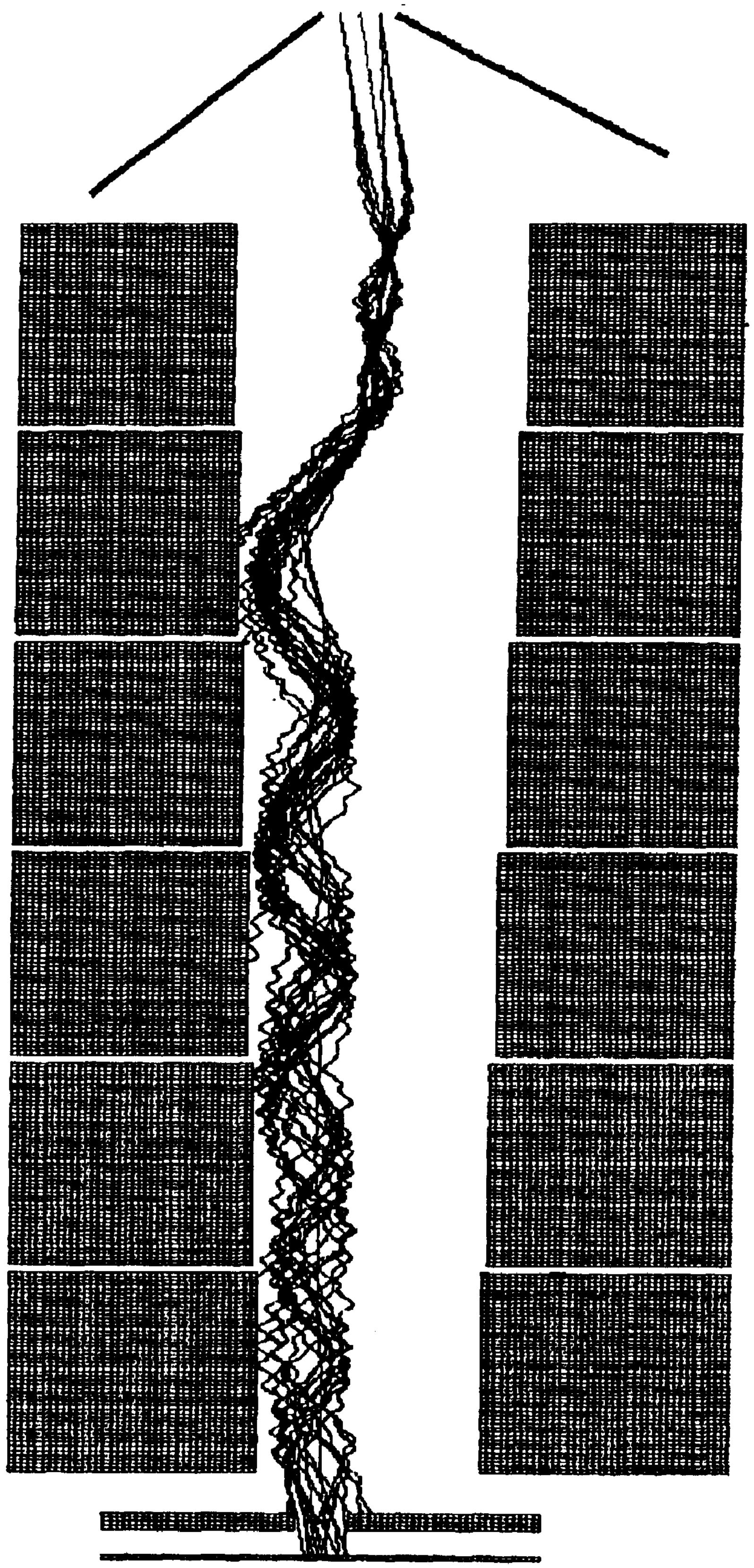
FIG. 5-G

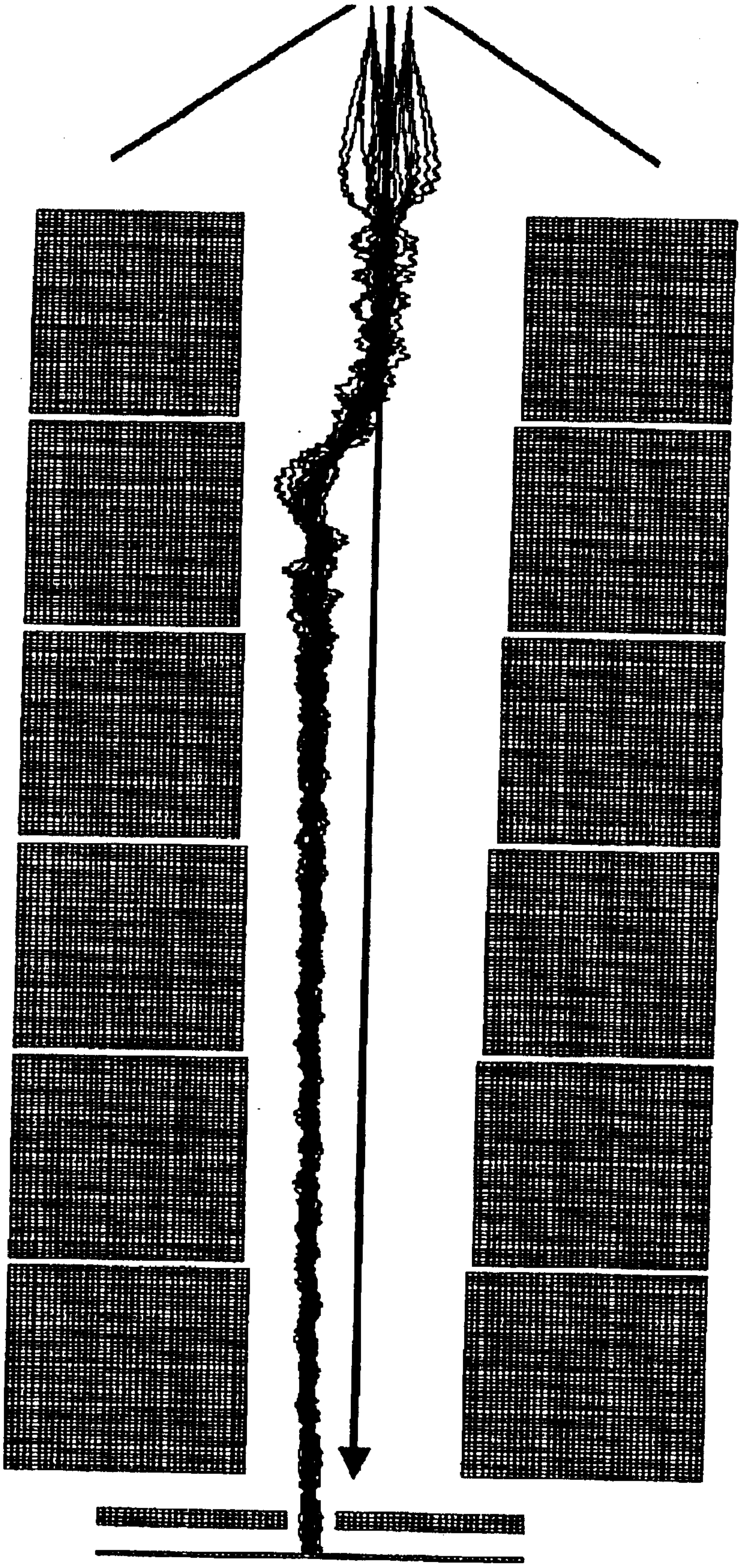
FIG. 5-H

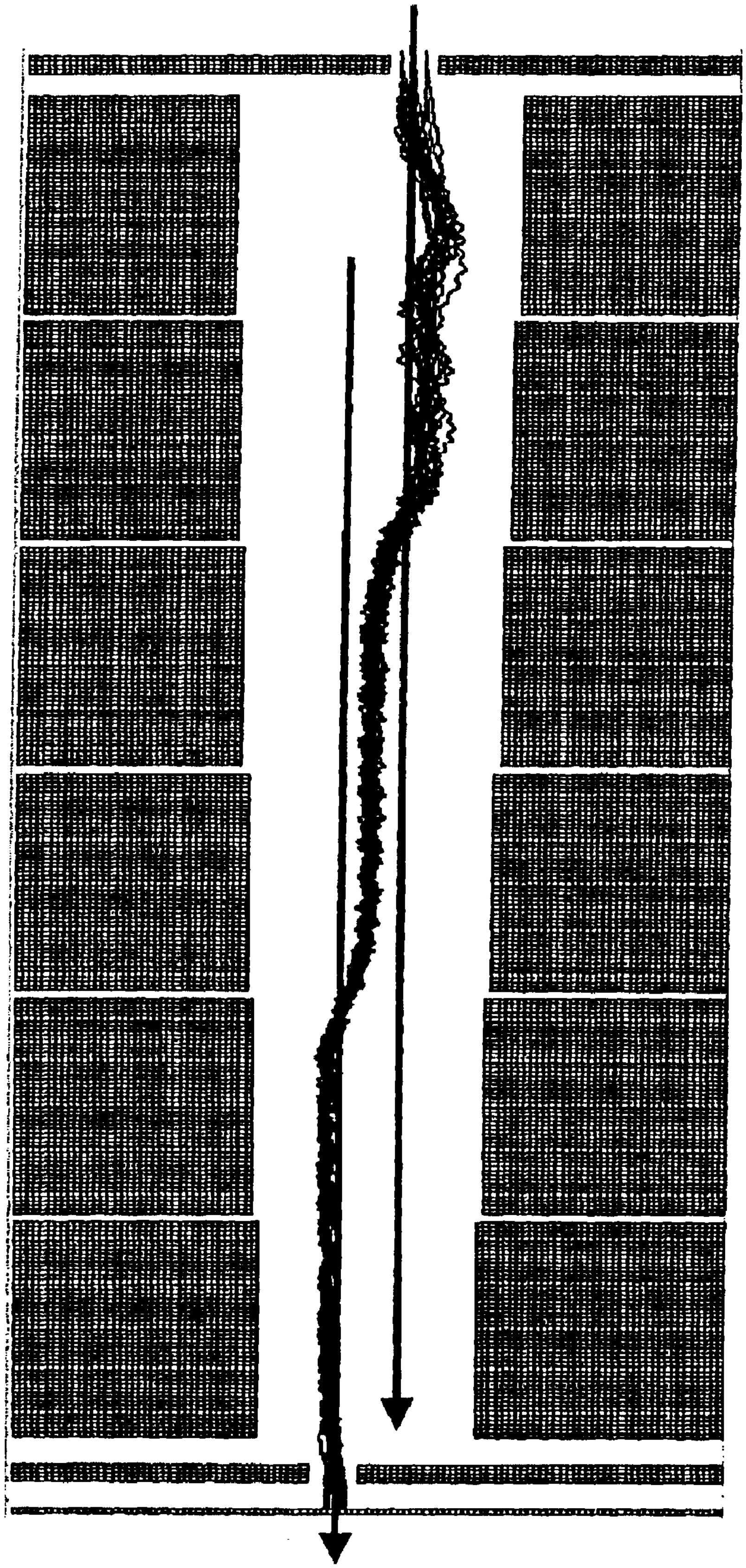
FIG. 5-I

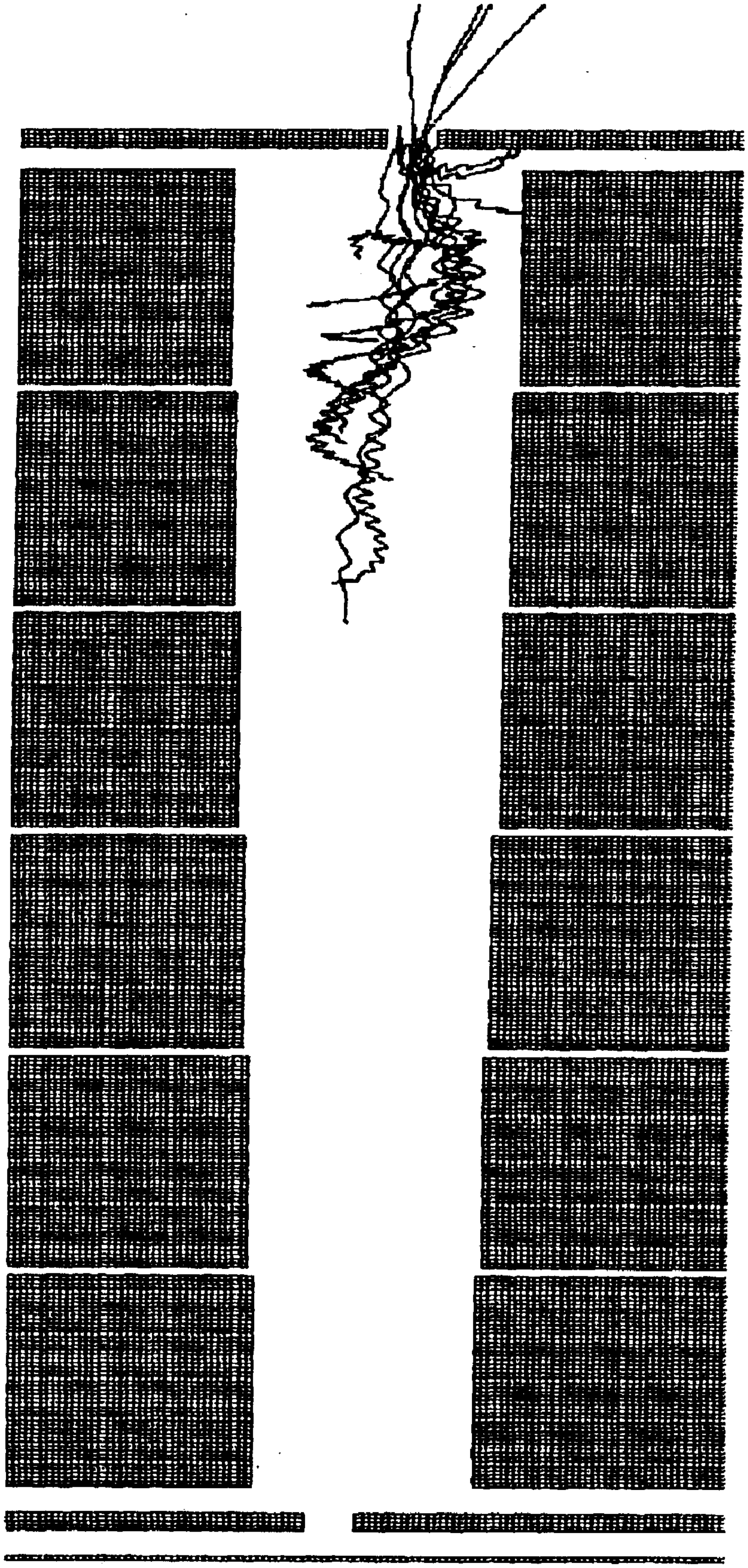
FIG. 5-J

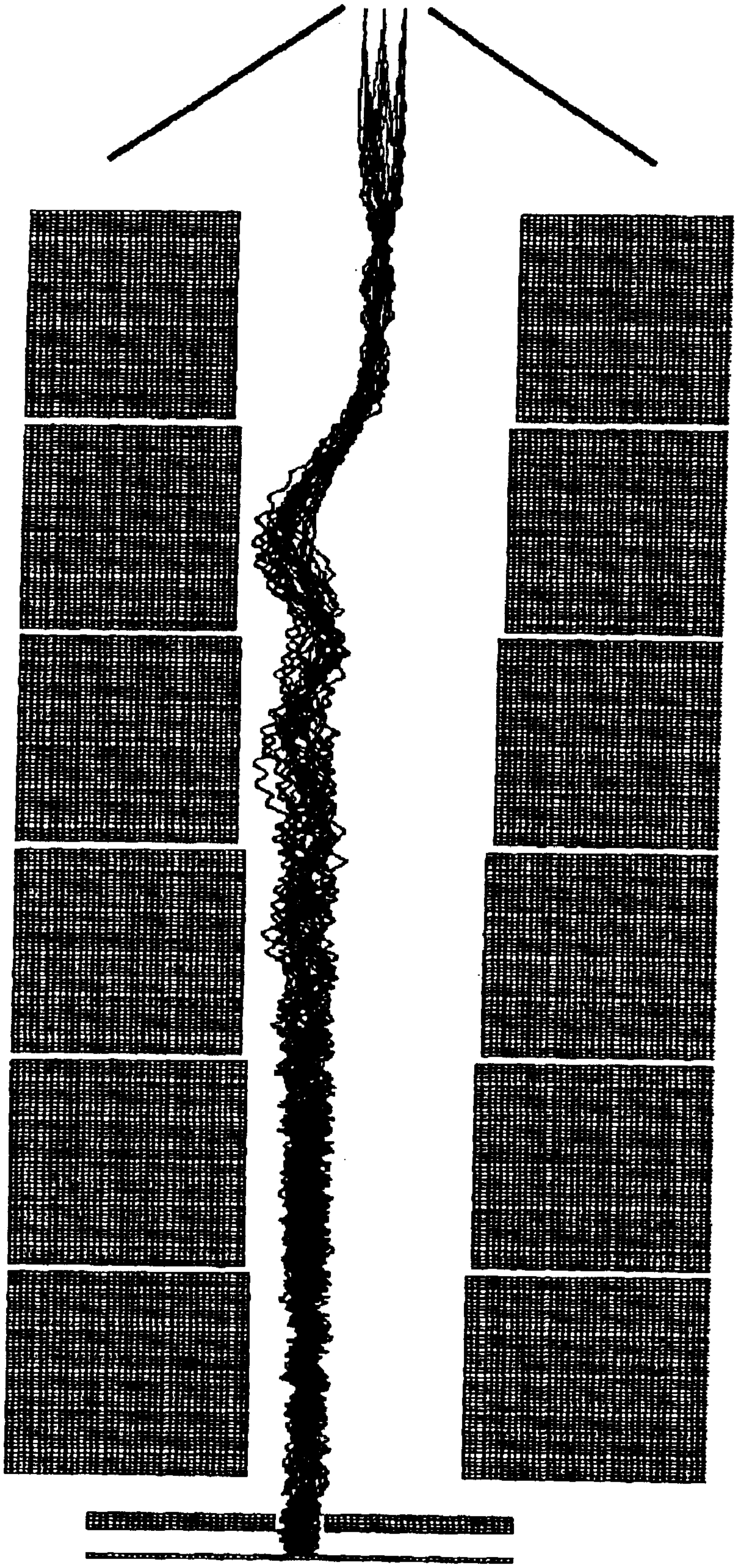
FIG. 5-K

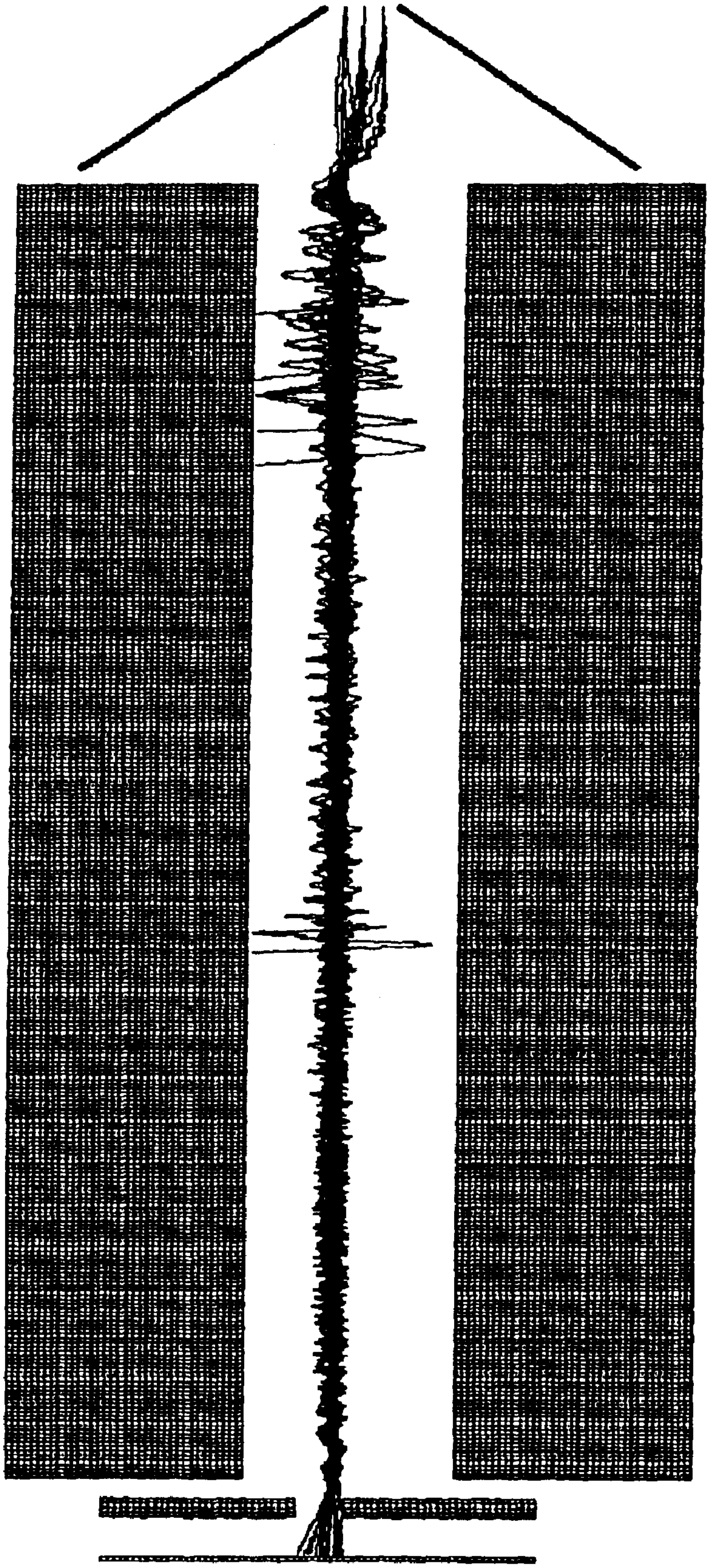
FIG. 5-L

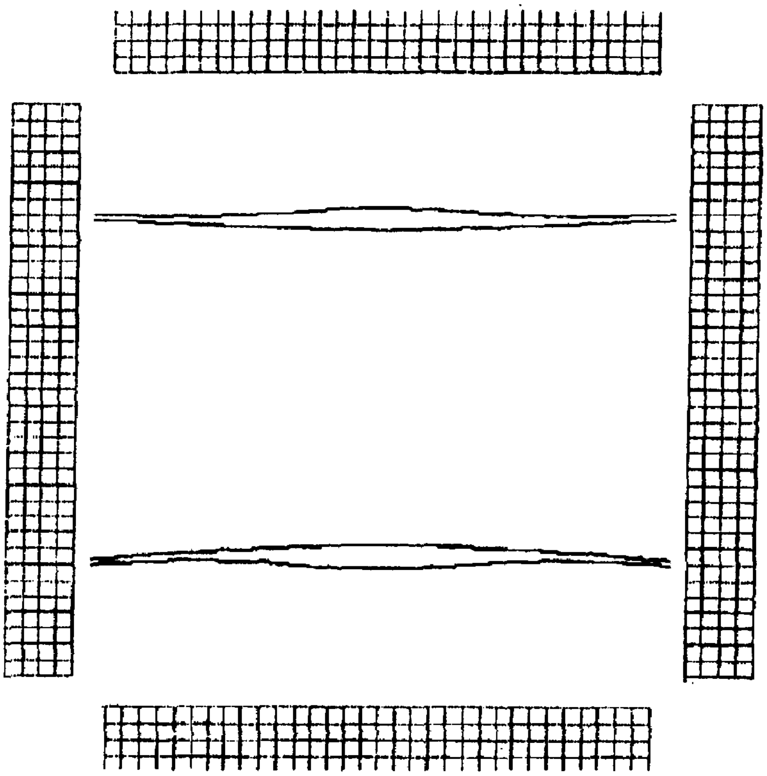
FIG. 6-A
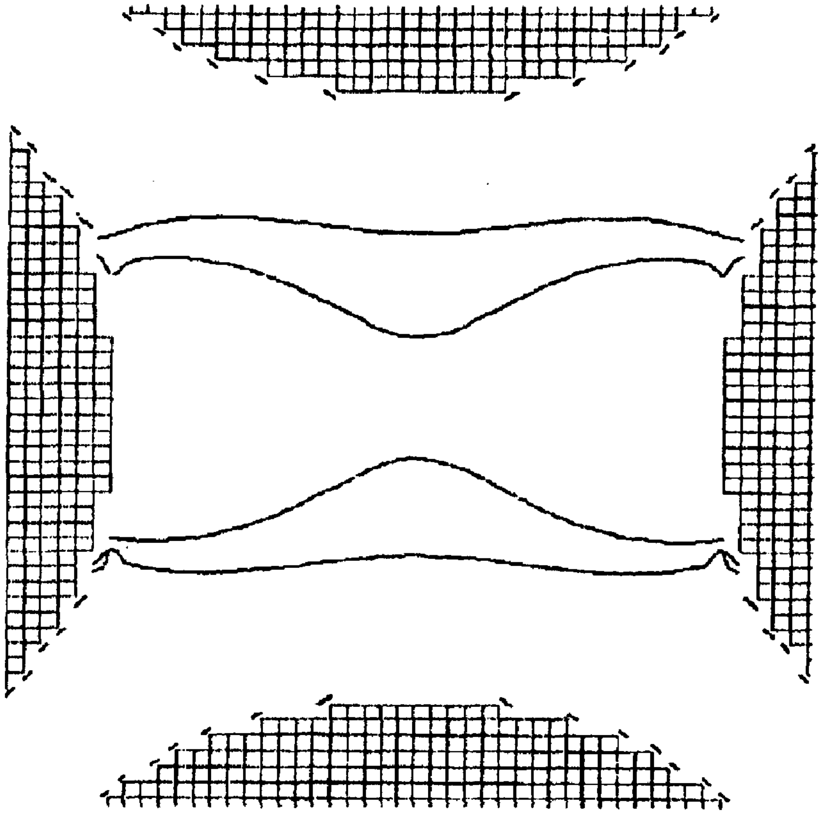
FIG. 6-B

ASYMMETRIC-FIELD ION GUIDING DEVICES

FIELD OF THE INVENTION

The invention in general relates to mass spectrometry, and in particular to electrodynamic ion guide structures suitable for use in mass spectrometers.

BACKGROUND OF THE INVENTION

Methods of mass analyzing chemical substances in the liquid phase often employ electrodynamic guiding structures for guiding ions into a mass analyzer. In a common approach, charged liquid droplets are generated in an ionization chamber using an atmospheric pressure ionization method such as electrospray ionization (ESI) or atmospheric pressure chemical ionization (APCI). The droplets are desolvated, and pass into a vacuum chamber through an orifice that limits the gas flow into the chamber. Gas with entrained ions exits the vacuum restriction and expands to form a shock structure. Ions and other gas can be removed from the silent zone of the shock structure by inserting a skimmer cone through a Mach disk into the silent zone, and allowing the ions to pass through a hole in the tip of the skimmer cone into the next vacuum chamber. The ions in the second vacuum chamber are captured by an electrodynamic ion guiding structure, and guided through the second chamber where more of the gas is pumped away. The ions next pass through a conductance-limiting aperture into a third vacuum chamber and into a mass analyzer. For further information on prior-art mass spectrometers and associated electrodynamic guiding structures see for example U.S. Pat. Nos. 4,963,736, 5,179,278, 5,248,875, 5,847,386, and 6,111,250.

Conventional mass spectrometers can suffer from large noise spikes in the mass spectrum generated by solvent droplets passing from the ionization chamber into the mass analyzer. In U.S. Pat. No. 5,750,993, Bier describes a method of reducing noise due to undesolved charged droplets or charged particles in an ion trap mass spectrometer coupled to an atmospheric pressure ionization source. A high DC voltage, for example about 300 V, is applied to an octopole guide or lens to block the passage of charged particles into the detector during analysis of trapped ions. The method described by Bier may not be optimally effective in preventing the passage of droplets into the analyzer.

SUMMARY OF THE INVENTION

In a preferred embodiment, the present invention provides a mass spectrometry apparatus comprising: an ionization chamber for forming ions of interest: a guide chamber having an inlet aperture in communication with the ionization chamber, and an outlet aperture; an electrodynamic ion guide positioned in the guide chamber, for guiding ions from the inlet aperture to the outlet aperture, a mass analyzer in communication with the outlet aperture, for receiving ions exiting the guide chamber through the outlet aperture; and an ion detector in communication with the mass analyzer, for receiving ions transmitted by the mass analyzer. The ion guide preferably comprises an inlet guide section for generating a first electrodynamic ion guiding field having a first generally longitudinal central field axis, situated such that ions transmitted through the inlet aperture enter the inlet guide section substantially along the first central field axis; and an outlet guide section longitudinally concatenated with the inlet guide section, for generating a second electrodynamic ion guiding field having a second generally longitudinal central field axis displaced from the first central field axis and substantially aligned with the outlet aperture. Displacing the inlet and outlet field axes allows reducing the noise caused by droplets, photons, and other neutral particles, while at the same time inserting the ions of interest along the central axis of the field. Inserting the ions of interest along the central axis of the guiding field allows maximizing the capture efficiency of the guide.

BRIEF DESCRIPTION OF THE DRAWINGS

The foregoing aspects and advantages of the present invention will become better understood upon reading the following detailed description and upon reference to the drawings where:

FIG. 3-A shows a schematic transverse view of one of the segments of the ion guide of FIG. 2.

FIG. 3-B shows a transformer arrangement suitable for generating a symmetric quadrupole guiding field, according to an embodiment of the present invention.

FIG. 3-C shows a transformer arrangement suitable for generating a guiding field having a symmetric quadrupole component and an asymmetric dipole component, according to an embodiment of the present invention.

FIG. 4-A shows a schematic longitudinal view of an ion guide comprising a plurality of geometrically-identical segments defining two guide sections, according to an embodiment of the present invention.

FIGS. 4-B and 4-C show schematic longitudinal and transverse views, respectively, of an ion guide comprising segmented parallel rods, according to an embodiment of the present invention.

FIG. 4-D shows a schematic longitudinal view of an ion guide comprising segmented tilted rods, according to an embodiment of the present invention.

FIGS. 5-A through 5-L illustrate exemplary computed trajectories for ions passing through ion guides under several conditions, according to the present invention.

FIGS. 6-A and 6-B illustrate computed electric dipole fields for a flat plate and a round rod electrode configuration, respectively, according to the present invention.

DETAILED DESCRIPTION OF THE INVENTION

In the following description, it is understood that each recited element or structure can be formed by or be part of a monolithic structure, or be formed from multiple distinct structures. For example, an input blocking structure/wall and an output blocking structure/wall can be provided as part of a single monolithic housing. A set of elements is understood to include one or more elements. Two concatenated elements (e.g. guide sections or segments) can be adjacent or can be separated by intervening elements. A voltage source may include one or more electrical nodes/leads and/or other electrical components (e.g. inductors, capacitors, transformers) generating desired voltage values.

The following description illustrates embodiments of the invention by way of example and not necessarily by way of limitation.

Figure 1:
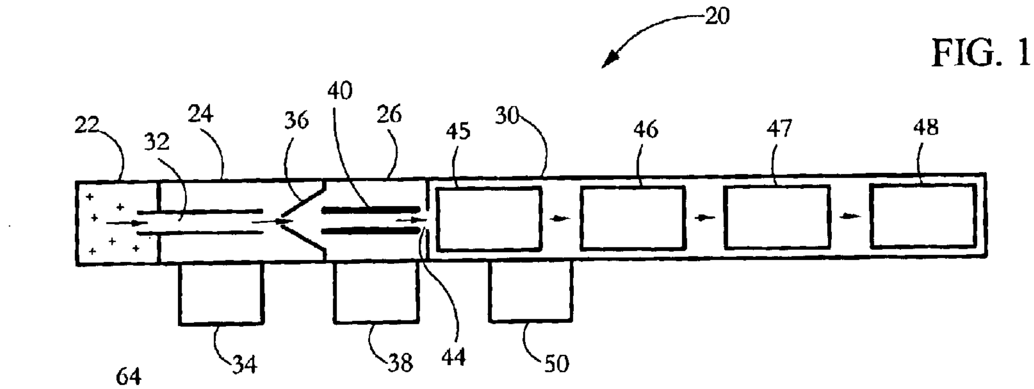
FIG. 1 is a schematic diagram of a mass spectrometry analysis apparatus according to a preferred embodiment of the present invention.

FIG. 1 is a schematic diagram of a mass spectrometer 20 according to a preferred embodiment of the present invention. Spectrometer 20 includes a plurality of chambers and associated pumps, guiding components, and analysis components shown in FIG. 1. An ionization chamber (source) 22 is used to generate ions of interest preferably at atmospheric pressure. The ions can be generated from a liquid or gas sample by known techniques such as electrospray ionization (ESI), atmospheric pressure chemical ionization (APCI), or photo-ionization. Ionization chamber 22 is connected to an inlet vacuum chamber 24 through an orifice 32 that limits the flow of gas into vacuum chamber 24. Orifice 32 may be defined by an elongated tube connecting chambers 22, 24. A first vacuum pump 34 is fluidically coupled to vacuum chamber 24, for maintaining the pressure within vacuum chamber 24 at a desired level, preferably between 0.1 torr and 10 torr.

A guide vacuum chamber 26 is fluidically connected to first vacuum chamber 24 through an aperture defined in a skimmer cone 36. The skimmer cone aperture preferably has a size of 1–2 mm. Skimmer cone 36 broadens from a tip in first vacuum chamber 24 to an outlet side within guide chamber 26. A second vacuum pump 38 is fluidically connected to guide chamber 26, for maintaining the pressure within guide chamber 26 at a desired level, preferably between 0.5 mtorr and 20 mtorr. Guide vacuum chamber 26 encloses an electrodynamic ion guiding structure (guide) 40, for selectively guiding ions of interest from the outlet side of skimmer cone 36 to a conductance-limiting outlet aperture 44 defined in an outlet wall of guide vacuum chamber 26.

Outlet aperture 44 is preferably offset from the inlet direction defined by the inlet aperture of skimmer cone 36, such that there is no line of sight between the inlet and outlet apertures. Offsetting the inlet and outlet axes of guide chamber 26 allows preventing liquid droplets, photons, and other neutral noise sources from exiting guide chamber 26 through outlet aperture 44. Preferably, the inlet direction defined by skimmer cone 36 is oriented at an angle relative to the geometric central axis of guide 40. Generally, the inlet direction defined by skimmer cone 36 may coincide with or be parallel to the geometric central axis of guide 40.

Outlet aperture 44 connects guide chamber 26 to an analysis vacuum chamber 30. Analysis chamber 30 may contain, in sequence: a first mass analyzer 45, a collision cell 46, a second mass analyzer 47, and an ion detector 48. Mass analyzers 45, 47 can be quadrupole mass filter, time-of-flight (TOF), ion trap, Fourier Transform Ion Cyclotron Resonance (FTICR), or other known types of analyzers. First mass analyzer 45 faces outlet aperture 44, for receiving ions passing through outlet aperture 44. Ions having a selected mass distribution are allowed to pass to collision cell 46, where the ions undergo collision-induced dissociation. Collision cell 46 may include an ion guide such as ion guide 40. Ions exiting collision cell 46 enter second mass analyzer 47. Ion detector 48 receives mass-selected ions transmitted by mass analyzer 47. A third vacuum pump 50 is fluidically connected to analysis chamber 30, for maintaining the pressure within analysis chamber 30 at a desired level, preferably between 1 and 100 μtorr, for example between 1 and 10 μtorr, or lower. Collision cell 46 may be maintained at a higher pressure, for example between 0.5 mtorr and 20 mtorr.

Figure 2:
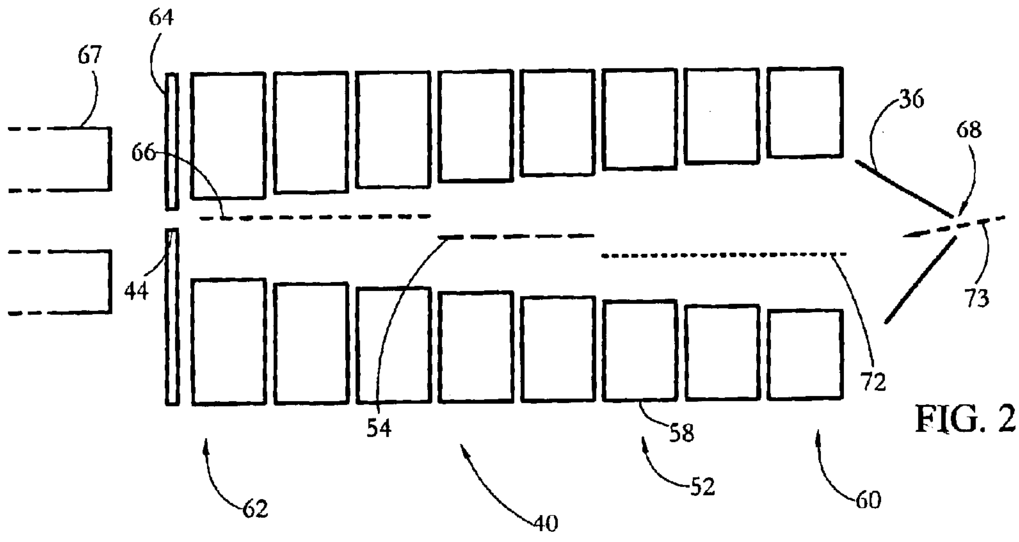
FIG. 2 shows a schematic longitudinal view of an electrodynamic ion guide comprising a plurality of progressively-narrowing segments defining three guide sections, according to a preferred embodiment of the present invention.

FIG. 2 shows a schematic longitudinal view of guide 40 according to a preferred embodiment of the present invention. Guide 40 includes a plurality of longitudinally-concatenated electrode segments 52. Segments 52 are aligned along a longitudinal central geometric axis 54 of guide 40. Each electrode segment 52 comprises a plurality of plate-shaped electrodes 58 disposed symmetrically about central axis 54. Each segment 52 comprises four or more symmetrically disposed electrodes 58. Preferably, the size of the interior space defined between the electrodes of segments 52 decreases monotonically (e.g. linearly) along central axis 54, from an inlet guide section 60 adjacent to skimmer cone 36 to an outlet guide section 62 adjacent to outlet aperture 44. Decreasing the distance between the electrodes increases the strength of the guiding electric field (for a constant voltage), which in turn reduces the radial (transverse) distribution of ions.

The center of the electrodynamic guiding field generated by guide 40 has different transverse positions along different longitudinal sections of guide 40. An inlet guiding field axis 72 and an outlet guiding field axis 66 are displaced from central axis 54. The center of the guiding field within an inner, middle section of guide 40 preferably coincides with central axis 54. Inlet axis 72 and outlet axis 66 are preferably displaced from central axis 54 in opposite directions, in order to maximize the transverse displacement generated for a given guiding voltage set. In general, a guide such as guide 40 may have a larger number of guide sections than illustrated. For example, each segment 52 could define a distinct guide section having a separate guiding field central axis.

Outlet aperture 44 is preferably a round aperture defined in a chamber wall 64 situated opposite skimmer cone 36. Outlet aperture 44 is transversely aligned with outlet guiding field axis 66. Outlet axis 66 is aligned with the entrance of mass analyzer 45, shown in FIG. 1. Mass analyzer 45 can include a plurality of analyzer electrodes 67 arranged symmetrically about outlet axis 66, as shown in FIG. 2. Analyzer electrodes 67 can form a transmission quadrupole whose central axis 66 is displaced from the central geometric axis 54 of guide 40.

Skimmer cone 36 has an inlet aperture 68 defining an inlet axis 73. Inlet axis 73 preferably forms a non-zero angle with central axis 54. In general, inlet axis 73 can be parallel to or coincide with central axis 54. Inlet aperture 68 is preferably positioned so as to send ions substantially to an inlet location along inlet guiding field axis 72. Positioning inlet aperture 68 to transfer ions into the local center of the guiding field allows maximizing the ion capture efficiency of guide 40. Inserting ions into guide 40 away from the center of the guiding field can subject the ions to undesired fringe fields exerting longitudinal repulsive forces on the ions. The longitudinal fringe components can act as a potential barrier impeding the movement of ions into the guiding field, and thus reducing the capture efficiency of the guide.

Guide 40 preferably has a length on the order of cm to tens of cm, for example about 6 cm, and an internal transverse size on the order of mm to cm, for example about 10 mm at the inlet and 6 mm at the midpoint or outlet of guide 40. If guide 40 is employed as part of a collision cell, the length of ion guide is preferably on the order of tens of cm, for example 10–20 cm. The interior size of guide 40 is preferably on the order of mm to cm, for example about 10 mm along inlet guide section 60 and 4–6 mm along outlet guide section 62. The inlet aperture defined by skimmer cone 36 preferably has a size on the order of mm, e.g. about 1–2 mm. The length of each segment 52 is preferably on the order of mm to cm, for example about 1–2 cm. The transverse displacement between the central field axes along adjacent guide sections is preferably on the order of mm, for example about 1–2 mm.

The angle between the central axis of skimmer cone 36 and central axis 54 can be between 0 and 45°, and is preferably between 2° and 15°. The angle is preferably comparable to the arctangent of the ratio of the midpoint transverse size of guide 40 to the length of guide 40. For example, if the length of guide 40 is about 6 cm and its midpoint internal transverse spacing is about 6 mm, the skimmer cone angle is preferably approximately equal to the arctangent of 1/10, or about 6°. Increasing the angle can lead to loss of ions within guide 40, while decreasing the angle can lead to an increase in the neutral particles allowed to pass through outlet aperture 44.

FIG. 3-A shows a schematic transverse view of an exemplary quadrupole guide segment 52 comprising four electrodes 58*a–d*, and a corresponding diagram of a set of voltage sources 74, 76 used to drive electrodes 58*a–d*. Each electrode 58*a–d* is mounted on a corresponding conductive lead 80 defined on a printed circuit board. Each electrode 58*a–d* is preferably I-shaped (H-shaped), with the mounting surface of the electrode separated from the guiding surface of the electrode by a transverse beam. Separating the mounting and guiding regions of electrodes 58*a–d* allows a reduction in the contamination of the insulative substrate around electrodes 58*a–d*. The relatively narrow transverse cross-sections of electrodes 58*a–d* also allow for reduced capacitive coupling between the electrodes of longitudinally-adjacent segments 52.

Electrodes 58*a–d* enclose a guiding space 72 for guiding gaseous ions. A first pair of electrodes 58*a–b* is disposed on opposite sides of guiding space 72 along a first transverse direction, while a second pair of electrodes 58*c–d* is disposed on opposite sides of guiding space 72 along a second transverse direction orthogonal to the first transverse direction. The first transverse direction is the direction along which outlet axis 44 is displaced from central axis 54 (shown in FIG. 2). Electrodes 58*a–d* comprise four square flat plates disposed symmetrically about a central axis equidistant to the four plates. Preferably, the transverse distances between the plates of different pairs of electrodes are equal to each other ($x_0=y_0$).

Two voltage sources 74, 76 are connected to electrodes 58*a–b*, for applying radio-frequency (RF) and/or DC voltages to electrodes 58*a–b*. Voltage sources 74, 76 can be thought of as components of a single voltage source 71 used to apply RF and/or DC voltages to multiple segments 52, as described below. A first radio-frequency (alternating) voltage source 74 is connected to the first pair of electrodes 58*a–b*, for applying to electrodes 58*a–b* a voltage having a first symmetric, in-phase quadrupole radio-frequency (RF) component $V_{RF1}$ and an out-of-phase dipole RF component $V_{RF3}$. A second RF voltage source 76 is connected to the second pair of electrodes 58*c–d*, for applying to electrodes 58*c–d* a voltage having a second symmetric, in-phase quadrupole RF component $V_{RF2}$. Preferably, the first RE voltage $V_{RF1}$ and the second RF voltage $V_{RF2}$ have the same frequency and amplitude, but are out of phase by 180° with respect to each other. Identical $V_{RF1}$ and $V_{RF2}$ voltages are preferably applied to all segments 52 of guide 40. Voltages $V_{RF1}$ and $V_{RF2}$ generate a symmetric, quadrupole component of the guiding field.

The dipole RF voltage $V_{RF3}$ preferably has the same frequency as the first and second RF voltages $V_{RF1}$ and $V_{RF2}$. The amplitude of the dipole RF voltage $V_{RF3}$ is preferably a fraction $\eta$=5–100% of the amplitude of the first RF voltage $V_{RF1}$. The fraction value determines the displacement between the local central guiding field axis and the central geometric axis of guide 40. The phase difference between the dipole RF voltage $V_{RF3}$ and the first RF voltage $V_{RF1}$ is preferably zero. The dipole voltage $V_{RF3}$ establishes a potential difference between electrodes 58*a–b*, and a corresponding dipole electric field directed generally along the y-axis. The dipole voltage $V_{RF3}$ displaces the central axis of the guiding (confining) electric field from the geometrical center of guiding space 72, along the y-axis. The direction of the displacement can be altered by changing the phase of the dipole voltage $V_{RF3}$ relative to the quadrupole voltage $V_{RF1}$ between 0 and $\pi$. Ions deviating from the central axis of the guiding field experience an average force directed toward the central field axis. In the absence of the dipole voltage $V_{RF3}$, the central axis of the guiding field would coincide with the geometric axis of guide 40.

Preferably, different values of the dipole voltage $V_{RF3}$ are applied to different segments 52 of guide 40. Generally, applying different dipole voltages to different sections of guide 40 allows offsetting the centers of the guiding fields along the different sections. In particular, offsetting the inlet and outlet centers of the guiding field reduces the noise which would otherwise be caused by droplets passing through guide 40. In a presently preferred implementation, a first dipole voltage is applied along the inlet section of guide 40, no dipole voltage is applied along a middle section of guide 40, and a second dipole voltage of opposite phase is applied along an outlet section of guide 40.

The quadrupole voltages $V_{RF1}$ and $V_{RF2}$ applied to guide 40 preferably have a 0-to-peak amplitude of about 50 to 500 V. For $\eta$=5–100%, the corresponding dipole voltage amplitude range is about 2.5 to 500 V. Higher voltages, such as voltages on the order of kV, may also be used if needed to effectively guide relatively massive ions. The frequency of the applied RF voltages is preferably on the order of hundreds of kHz to MHz. Higher frequencies may be used, for example if the guided ions include electrons. Any DC voltage difference between adjacent segments preferably corresponds to an inter-segment electric field on the order of tenths of V/cm, for example about 0.5 V/cm.

An ion guide such as guide 40 can be used as part of an ion collision cell. Mass selected ions can be accelerated to an appropriate collision energy and focused into a collision cell at an elevated pressure. Collisions between the energetic ions and the gas molecules in the collision cell cause the ions to dissociate into smaller ions and neutral fragments. The ions resulting from the dissociation process can then be inserted into a mass analyzer as described above. Collision cells are often constructed by using an electrodynamic ion guiding structure that is surrounded by a low gas conductance enclosure with an entrance and exit hole located along the geometrical axis of symmetry. The ion guiding structure confines the product ions to the interior of the structure due to the electrodynamic fields, and the product ions exit at the end of the structure.

An ion guide such as guide 40 can also be used as an ion trap for collision damping ions of interest prior to mass analysis. Collisions of ions with a light gas remove excess kinetic energy from the ions, which in turn will cause the ions to locate in the region of the trapping field where the restoring force is a minimum, i.e. the center of the trap. Collision cooling of the ion kinetic temperature can be used to allow ions to accumulate along the central axis of the two dimensional guiding/trapping field. The number of collisions experienced by an ion increases with pressure, which is inversely proportional to the mean free path. A gas at a pressure of 20 millitorr has a molecular number density at 20° C. of $7.0\times10^{14}$ molecules $cm^{-3}$. An ion with a collision cross section of 100 square angstroms will therefore have a mean free path of approximately 1 mm. Collision cooling reduces both the transverse as well as the axial ion kinetic energy. Therefore, ions will accumulate along the axis of the guiding field and move along the axis only slowly, due to the space charge force of the accumulated ions. This limitation can be eliminated by the addition of an axial DC field to transport the ions along the axis. The axial DC field can be formed by applying a decreasing DC potential to each segment 52 of ion guide 40, such that a DC voltage difference exists between adjacent segments 52.

By applying suitable DC voltages to its last segment 52, ion guide 40 can be employed as an ion gate for temporarily preventing the passage ions through outlet aperture 44. For positive ions, the DC voltage applied to the last segment 52 is increased to a high-enough value that ions cannot pass through. Suitable DC voltages depend on the mass of the ions to be stopped, and can range from a few V to tens of V. The axial DC voltages applied to the other segments 52 prevent the reflection of the ions back to the entrance segment 52. Ions accumulate within guide 40, and can be then released to pass through outlet aperture 44 by suddenly lowering the DC voltage applied to the last segment 52. Accumulating ions while mass analysis is occurring can be particularly useful with mass analyzers that are not continuous scanning devices. Typically, in ion trap mass analyzers, the ions are periodically gated into the analyzer in order to fill the analyzer. During mass analysis, the ions within the analyzer are released out while incoming ions are discarded and lost. Employing guide 40 as an ion gate allows accumulating and storing incoming ions during the mass analysis period, and subsequently releasing the ions into the mass analyzer. Accumulating ions within guide 40 during the mass analysis period allows increasing the fraction of sample ions used for mass analysis; thus increasing the sensitivity of the mass analyzer.

Guide 40 can be made by soldering electrodes 58*a–d* to corresponding leads 80 of four planar circuit boards. During assembly, electrodes 58*a–d* can be held by a fixture so that their relative orientation is fixed The attachment to the printed circuit boards can be performed by a re-flow solder technique commonly used for surface mount printed wire assemblies. The boards can be secured together to form a generally-tubular assembly. Electrodes 58*a–d* can be made of Cu, Ni-plated Cu, or other conductive materials.

FIG. 3-B shows a transformer arrangement suitable for generating a quadrupole guiding field, according to an embodiment of the present invention. A transformer 90 has an externally-driven primary inductor 90', and a secondary inductor inductively coupled to primary inductor 90'. A first lead of secondary inductor 90" is commonly connected to the first pair of electrodes 58*a–b*, and a second lead of secondary inductor 90" is commonly connected to the second pair of electrodes 58*c–d*. The first RF voltage $V_{RF1}$ applied to electrodes 58*a–b* is 180° out of phase with respect to the second RF voltage $V_{RF2}$ applied to electrodes 58*c–d*.

FIG. 3-C shows a transformer arrangement suitable for generating a guiding field having a quadrupole component and a dipole component, according to an embodiment of the present invention. As above, the second lead of secondary inductor 90" is commonly connected to the second pair of electrodes 58*c–d*, and applies the second RF voltage $V_{RF2}$ to electrodes 58*c–d*. The first lead of secondary inductor 90" is connected to a center tap of a secondary inductor 92" of a second transformer 92. The center tap of secondary inductor 92" drives the two leads of secondary inductor 92" in-phase with the first lead of secondary inductor 90", to apply the first RF voltage $V_{RF1}$ to electrodes 58*a–b*. The two leads of secondary inductor 92" are connected to electrodes 58*a–b*, respectively. The coupling between electrodes 58*a–b* and the first lead of secondary inductor 90" (through the center tap of secondary electrode 92") generates an in-phase quadrupole component $V_{RF1}$ of the RF voltage applied to electrodes 58*a–b*. The is inductive coupling between secondary inductor 92" and an externally-driven primary inductor 92' generates an out-of-phase dipole component $V_{RF3}$ of the RF voltage applied to electrodes 58*a–b*. Generally, an RF voltage having a quadrupole and a dipole component can be applied to a pair of opposing electrodes using various circuits, such as circuits including inductors and capacitors, rather than through the use of the center tap of a transformer.

FIG. 4-A shows a longitudinal view of an ion guide 140 according to another embodiment of the present invention. Ion guide 140 comprises a plurality of geometrically-identical, longitudinally-concatenated segments 152. Segments 152 enclose a guiding space 172 having a uniform transverse cross-section along guide 140. Segments 152 define two guide sections: an inlet guide section 160 and an outlet guide section 162. A central axis 154 of the ion guiding field within inlet section 160 coincides with the geometric central longitudinal axis of symmetry of guide 140. A central axis 166 of the ion guiding field within outlet section 162 is displaced from the central geometric axis. Inlet field central axis 154 is situated to receive ions entering guide 140 through an inlet aperture 168 defined in an inlet chamber wall 136. Inlet aperture 168 is aligned with inlet field central axis 154. Outlet field central axis 166 is aligned with an outlet aperture 144 defined in an outlet chamber wall 164.

FIGS. 4-B and 4-C show longitudinal and transverse views, respectively, of an ion guide 240 according to another embodiment of the present invention. Ion guide 240 comprises an inlet guide section 260 and an outlet guide section 262, each comprising four round (e.g. cylindrical) rods in a quadrupole arrangement. The rods of the two guide sections are arranged end-to-end. A central field axis 255 along inlet guide section 260 is displaced from the geometric central axis of guide 240, while a central field axis 266 along outlet guide section 262 coincides with the geometric central axis of guide 240.

FIG. 4-D shows a longitudinal view of an ion guide 340 according to another embodiment of the present invention. Ion guide 340 comprises an inlet guide section 360, an outlet guide section 362, and an intermediate guide section 361 positioned between guide sections 260, 262. Corresponding rods of the three guide sections are arranged end-to-end. The central field axes 354, 355, 366 are all displaced from the central geometric axis of guide 340.

While a guiding structure using round rods can be used in general to generate a guiding field having a dipole component, guiding structures using segmented flat plates are presently preferred in an ion guiding structure of the present invention. Guiding structures using flat plates are capable of generating relatively uniform dipole fields, which allow a reduction in the number of ions lost due to guiding field non-uniformities. For guiding structures having no dipole component (e.g. a quadrupole structure with the guiding field central axis coincident with the geometric central axis), rounds rod and flat plate configurations may generate symmetric fields of comparable uniformity.

The following discussion illustrates several theoretical considerations useful for better understanding various embodiment of the present invention, and is not intended to limit the invention.

Electrodynamic Guiding Field

The canonical form of the electrodynamic potential for a time-dependent field in a cylindrical coordinate system (r,z) is given by:

$$V_T(r,z,t)=\sum_{N=0}^{\infty}A_N\Phi_N(r,z)\prod(t)+\sum_{N=0}^{\infty}B_NU_N(r,z) \tag{1}$$

where $\Pi(t)=\cos(\Omega t)$ expresses the temporal variations of the field with drive frequency $\Omega$; $\Phi_N(r,z)$ and $U_N(r,z)$ represent the dynamic and static spatial variations of the field and $A_N$, $B_N$ the normalized constants, respectively. The spatial terms are related to the Legendre polynomials $P_N \cos(\theta)$ of order N. In a field with rotational symmetry the potential is independent of the angle $\phi$. The terms of the polynomial are expressed here as a function of the cylindrical coordinates (r,z) and the arbitrary distance necessary to fix the boundary conditions. Quadrupole fields are of particular interest, because quadrupole fields having both AC and DC components can be used as mass filters. Quadrupole fields having only an AC component have been used as ion guiding devices because this type of field will focus ions in the transverse direction, but not in the axial direction; thereby allowing ions to move along the axial direction unaffected by the AC field.

The general form of the potential field in a pure quadrupole field is:

$$V_Q=\frac{V}{r_0^2}[\lambda x^2+\sigma y^2+\gamma z^2] \tag{2}$$

The potential field must satisfy Laplace's equation:

$$\nabla^2 V_Q=0 \tag{3}$$

From which the following relationship is established:

$$\lambda+\sigma+\gamma=0 \tag{4}$$

A pure quadrupole field can be formed from four hyperbolic surfaces, symmetrically disposed about an axis of symmetry, and extending to infinity. This results in the following relationship between the parameters in equation 4: $\lambda=-\sigma$ and $\gamma=0$. The zero-to-peak amplitude of the electro-dynamic voltage is V, with frequency $\Omega$, and U is the DC potential applied to each electrode pair. The total potential applied to each electrode set $V_Q$ is:

$$V_x=+V\cos(\Omega t) \text{ and } V_y=-V\cos(\Omega t). \tag{5}$$

The general form of the equations of motion for ions in an ideal quadrupole potential $V_Q$ field can be obtained from the vector equation:

$$m\frac{\partial^2\vec{R}}{\partial t^2}+e\vec{\nabla}V_Q=0 \tag{6}$$

where the position vector is $\vec{R}$ (x, y, z), m is the ion mass and e is the charge of the ion. By convention the axis of symmetry of the four electrodes is along the z-axis, and the opposing pairs of electrodes are oriented along the x-axis and y-axis. The equations of the ion motion for the constraints of equation 4 when applied to equation 2 ($\lambda=1$, $\sigma=1$) allow the independent separation of the motion into the x and y components.

$$\vec{E}_x=-\frac{\partial V_Q}{\partial x}=-\frac{2\lambda x}{r_0^2}V\cos(\Omega t) \tag{7a}$$

$$\vec{E}_y=-\frac{\partial V_Q}{\partial y}=-\frac{2\lambda y}{r_0^2}V\cos(\Omega t) \tag{7b}$$

The canonical form of these equations when equation 7 is substituted into equation 6 is:

$$\frac{d^2u}{d\zeta^2}-2q_v\cos(2\zeta)u=0 \tag{8}$$

which is the well-known Mathieu equation; where the dimensionless parameters $\zeta$, and $q_u$ are:

$$\zeta=\frac{\Omega t}{2} \tag{9a}$$

$$q_u=\psi 4\, eV/[m\, r_0^2\Omega^2] \tag{9b}$$

where $\psi=\lambda$ or $\sigma$ and u=x or y. This second order differential equation is the Mathieu equation. The stable solutions to the equation are characterized by the parameters $q_u$; the value of the parameter defines the operating point of the ion within the stability region. The general solution to equation 9 is:

$$u(\zeta)=A\sum_{n=-\infty}^{+\infty}C_{2n}\cos(2n+\beta)\zeta+B\sum_{n=-\infty}^{+\infty}C_{2n}\sin(2n+\beta)\zeta. \tag{10a}$$

The secular frequency of the ion motion, $\omega_n$ can be determined from the value of $\beta$:

$$\omega_n=(n+/-\beta/2)\Omega \tag{10b}$$

The value of $\beta$ is a function of the working point in ($q_u$) space and can be computed from a well known continuing fraction.

If an additional alternating potential $V_D$ (zero-to-peak) is applied between each electrode of one set, a new potential field is formed. If $V_D$ is applied to the electrode set oriented along the y-axis, a new potential results that contains a dipole component in the potential field.

The applied potential becomes:

$$V_{yelectrode1}=-V\cos(\Omega t)+\frac{V_D}{2}\cos(\Omega t+\varphi) \tag{11a}$$

$$V_{yelectrode2}=-V\cos(\Omega t)-\frac{V_D}{2}\cos(\Omega t+\varphi) \tag{11b}$$

The potential field between the two electrodes along the y-axis becomes:

$$V_{Ty}=V_{Qy}+V_{Dy}=\frac{y^2}{r_0^2}V\cos(\Omega t)+\frac{V_D y}{2y_0}\cos(\Omega t+\varphi) \tag{12}$$

where $y_0$ is the distance from the axis of symmetry to the surface of the electrode, and $$r_0^2=x_0^2+y_0^2. \tag{13}$$

The dipole voltage is phase shifted by $+\phi$ with respect to the quadrupole field, $V_{Qy}$. Restricting the phase to values of:

$\phi=N\pi$; where N=0,1,2,- -; $V_{Dy}=V_{Dy(\phi=0)}(-1)^N$, the instantaneous electric field acting on an ion in the axial direction due to the potential field $V_{TY}$ $$E_y = \frac{\partial V}{\partial y} = \frac{2y}{r_0^2} V\cos(\Omega t) - \frac{V_D}{2y_0}\cos(\Omega t) \tag{14}$$

The equation of ion motion becomes:

$$m\frac{d^2 y}{dt^2} = -\left(\frac{-e2_y V}{r_0^2} + \frac{eV_D}{2y_0}\right)\cos(\Omega t) \tag{15}$$

Substituting $$\zeta = \frac{\Omega t}{2},$$

equation (16) is obtained.

$$\frac{d^2 y}{dt^2} = \frac{\Omega^2}{2}\frac{d^2 y}{d\zeta^2} \tag{16}$$

By substitution of equation 16 in equation 15 and $2\zeta=\Omega t$, the basic equation of the ion motion in the axial direction is obtained:

$$\frac{d^2 y}{d\zeta^2} - 2\left(\frac{4eV}{mr_0^2\Omega^2}y - \frac{eV_D}{my_0\Omega^2}\right)\cos(2\zeta) = 0 \tag{17}$$

Defining:

$$q_y = \frac{4eV}{mr_0^2\Omega^2} \tag{18a}$$

$$q_{yD} = -\frac{eV_d}{my_0\Omega^2} \tag{18b}$$

and by substitution of equation 18a and equation 18b into equation 17, an equation similar to the Mathieu equation is obtained:

$$\frac{d^2 y}{d\zeta^2} - 2(q_y y + q_{yD})\cos(2\zeta) = 0 \tag{19}$$

The following definition and substitutions:

$$u = (q_y y + q_{yD}) \text{ and } \frac{d^2 u}{d\zeta^2} = q_y\frac{d^2 y}{d\zeta^2}$$

into equation 18 yield the form of the Mathieu equation:

$$\frac{d^2 u}{d\zeta^2} - 2q_y u\cos(2\zeta) = 0 \tag{20}$$

The axial displacement of the ion can found to be the sum of two terms:

$$y = \frac{u - q_D}{q_y} = \frac{u}{q_y} - \frac{q_D}{q_y} \tag{21}$$

The first term represents the normal time dependent oscillatory solution, u(ζ) as in equation 10; the second term is an additive offset value which expresses the axial displacement of the ion motion due to the dipole:

$$-\frac{q_D}{q_y} = \frac{r_0^2 V_D}{4y_0 V} \tag{22}$$

During mass analysis it is common to increase the AC voltage of the guiding field as a function of mass. In the special case in which $V_D=\eta V_{ac}$ equation 22 becomes:

$$-\frac{q_D}{q_y} = \frac{r_0^2}{4y_0}\eta \tag{23}$$

and thus:

$$y = \frac{u}{q_y} + \frac{r_0^2}{4y_0}\eta \tag{24}$$

When the dipole is properly phased and present as a constant fraction η of the guiding field, it can be seen from equation 24 that the ion motion is uniformly displaced in the axial direction by a constant amount. The magnitude and sign of the displacement is independent of the mass-to-charge ratio and the polarity of the ion charge. The displacement depends only on the percentage η of dipole and the geometric dimensions of the ion guide structure. The direction of the displacement can be altered by changing the phase of the dipole from 0 to π.

The results described below illustrate characteristics of particular implementations of the present invention, and are not intended to limit the invention.

Results

FIGS. 5-A–L show simulated ion trajectories for several ion guide configurations. The simulation was performed using SIMION software available from the Idaho National Engineering and Environmental Laboratory, Idaho Falls, Id. Parameter values used in the simulation include: ion mass-to-charge ratio of 800 Da, RF ion guide voltage of 400 V (zero to peak), ion guide length of 60 mm, inner diameter of 5 mm, guide frequency of 1.05 MHz, pressure equivalent to a mean free path of 1 mm, initial ion energy through the skimmer cone hole of 1 eV, common DC offset of all four ion guide plates of −5 V, voltage difference between adjacent segments of −0.5 V, an exit lens of −15 V, and a stop plat of −20 V (if applicable). Other parameter values (e.g. dipole voltage ratios) arc described below with reference to each figure.

FIG. 5-A shows a computed trajectory for a single ion entering a six-segment ion guiding structure such as the one illustrated in FIGS. 2–3, without the dipole generator $V_{rf3}$ and with a mean free path of 1 mm. FIG. 5-A shows that, in the absence of the applied dipole voltage, the ion trajectory follows generally the geometric axis of symmetry of the guide, and does not exit the guide chamber through the displaced outlet aperture. FIG. 5-A also illustrates a gradual decrease in the amplitude of the transverse oscillations of the ion as the ion progresses through the guide.

FIG. 5-B shows a computed trajectory for a single ion entering a structure such as the one in FIG. 5-A. The first two segments have a dipole component, the following two segments have no dipole component, and the last two segments have a dipole component 180° out of phase relative to the dipole component of the two segments. The dipole ratio is $\eta$=100% and the mean free path is 1 mm. FIG. 5-C shows computed trajectories for number of ions entering the ion guide of FIG. 5-B, for varying entrance positions, initial angles, and initial starting times to relative to the RF guiding field phase.

FIG. 5-D shows a computed trajectory for a single ion entering a structure similar to that of FIG. 5-A, with the dipole generator $V_{rf3}$ present ($V_{rf3}=V_{rf1}$ and $\eta$=100%) for all guide segments following the first guide segment, and a mean free path of 1 mm. No dipole voltage is applied to the first guide segment. As illustrated, the ion trajectory is displaced from the geometric axis of the guide after the first guide segment, and the ion exits through the outlet aperture aligned with the central field axis.

FIG. 5-E shows computed trajectories for a distribution of ions entering the structure of FIG. 5-D, without the dipole generator $V_{rf3}$. The ions were distributed across the skimmer hole and with a small angular spread about a nominal angle of 6 degrees with respect to the axis of the structure. The ions entered the structure at random RF phases. FIG. 5-F shows the trajectory of a distribution of ions entering the structure of FIG. 5-E, but with the dipole generator $V_{rf3}$ present ($V_{rf3}=V_{rf1}$). FIG. 5-G illustrates the effect of lowering the gas pressure in the guide structure of FIG. 5-F to a mean free path of 10 mm. Many of the ions are lost due to collisions with the guide plates before the ions encounter the conductance aperture at the exit, because of insufficient collision cooling and the large displacement of the ions towards the electrodes by the dipole field.

FIG. 5-H shows computed trajectories for a distribution of ions entering a structure similar to the one shown in FIG. 5-D, but with a zero entrance angle (i.e. the inlet aperture oriented exactly along the central geometric axis}. The mean free path is 1 mm. FIG. 5-1 shows computed trajectories for a distribution of ions entering a collision cell having a guiding field axis distribution similar to the one shown in FIG. 4-A, with a progressively narrowing spacing between the guide electrodes. The middle two segments in FIG. 5-I generate no dipole electric field. FIG. 5-J illustrates computed trajectories for a guide such as the one shown in FIG. 5-A, employed as an ion gate. The gate is closed by reversing the phase on the inlet and outlet guide segments. Reversing the phase subjects incoming ions to fringe fields acting as a barrier, rather than to the center of the restoring field. No dipole is applied, and the mean free path is 4 mm.

FIG. 5-K shows computed displacements caused by a dipole field component for a group of ions, for flat plate electrodes and a mean free path of 4 mm. FIG. 5-L shows computed displacements caused by a dipole field component for a group of ions, for continuous, cylindrical rod electrodes and a mean free path of 4 mm. A comparison of FIGS. 5-K and 5-L reveals that the magnitude of the displacement is smaller for the round rod configuration than for the flat plate configuration; and that many ions strike the electrodes and are lost in the round rod configuration. These effects are due to the greater deviation from an ideal dipole in the round rod configuration. The deviation increases as the displacement from the center increases.

FIGS. 6-A and 6-B show two equipotential surfaces perpendicular to the dipole electric fields, computed for flat plate and round rod configuration, respectively. As illustrated, the flat plate configuration generates a relatively uniform dipole electric field.

It will be clear to one skilled in the art that the above embodiments may be altered in many ways without departing from the scope of the invention. Accordingly, the scope of the invention should be determined by the following claims and their legal equivalents.

What is claimed is:

1. A mass spectrometry apparatus comprising:

an ionization chamber for forming ions of interest;

a guide chamber having an inlet aperture in communication with the ionization chamber, and an outlet aperture, wherein a central axis of the outlet aperture is displaced from a central axis of the inlet aperture;

an electrodynamic ion guide positioned in the guide chamber, for guiding ions from the inlet aperture to the outlet aperture, the ion guide comprising an inlet guide section for generating a first electrodynamic ion guiding field having a first generally longitudinal central field axis, situated such that ions transmitted through the inlet aperture enter the inlet guide section substantially along the first central field axis;

an outlet guide section longitudinally concatenated with the inlet guide section, for generating a second electrodynamic ion guiding field having a second generally longitudinal central field axis displaced from the first central field axis and substantially aligned with the outlet aperture;

a mass analyzer in communication with the outlet aperture, for receiving ions exiting the guide chamber through the outlet aperture; and an ion detector in communication with the mass analyzer, for receiving ions transmitted by the mass analyzer.

2. The apparatus of claim 1, wherein:

the inlet guide section comprises a first plurality of quadrupole electrodes disposed symmetrically about a longitudinal, central geometric axis; and the outlet guide section comprises a second plurality of quadrupole electrodes disposed symmetrically about the central geometric axis.

3. The apparatus of claim 2, wherein the first field axis substantially coincides with the central geometric axis.

4. The apparatus of claim 1, wherein:

the first guiding field has a quadrupole component; and the second guiding field is an asymmetric guiding field having a quadrupole component and a dipole component.

5. The apparatus of claim 4, wherein the first guiding field is a symmetric quadrupole field.

6. The apparatus of claim 1, further comprising:

a first voltage source coupled to the inlet guide section, for applying a first quadrupole voltage set to the inlet guide section to generate the first guiding field, wherein the first guiding field is a symmetric quadrupole field; and a second voltage source coupled to the outlet guide section, for applying a second voltage set to the outlet guide section, the second voltage set comprising a quadrupole component for generating a symmetric quadrupole field component of the second guiding field, and a dipole component for generating a dipole field component of the second guiding field.

7. The apparatus of claim 6, wherein the first voltage source comprises a pair of leads of a secondary inductor of a transformer, wherein a first lead of the pair of leads is commonly connected to a first pair of opposing electrodes of the inlet guide section, and a second lead of the pair of leads is commonly connected to a second pair of opposing electrodes of the inlet guide section.

8. The apparatus of claim 6, wherein the second voltage source comprises a first pair of leads of a secondary inductor of a first transformer, and a second pair of leads of a secondary inductor of a second transformer, wherein:

a first lead of the first pair of leads is commonly connected to a first pair of opposing electrodes of the outlet guide section, a second lead of the first pair of leads is connected to a center tap of the secondary inductor of the second transformer, a first lead of the second pair of leads is connected to a first electrode of a second pair of opposing electrodes of the outlet guide section, and a second lead of the second pair of leads is connected to a second electrode of the second pair of opposing electrodes of the outlet guide section.

9. The apparatus of claim 1, further comprising a driving DC voltage source coupled to at least one of the inlet guide section and the outlet guide section, for applying a driving DC voltage to at least part of the at least one of the inlet guide section and the outlet guide section to generate a longitudinal ion driving field.

10. The apparatus of claim 1, wherein the inlet guide section comprises a set of longitudinally-sequenced segments each comprising a plurality of conductive plates.

11. The apparatus of claim 1, wherein the inlet guide section comprises a plurality of generally-longitudinal rods.

12. The apparatus of claim 1, wherein an internal guiding space of the ion guide narrows from an inlet end of the guide to an outlet end of the guide.

13. The apparatus of claim 1, wherein:

the mass analyzer comprises a plurality of analyzer electrodes disposed symmetrically about an analyzer central axis substantially aligned with the outlet aperture of the guide chamber, and the outlet guide section comprises a plurality of outlet guiding electrodes disposed symmetrically about a central geometric axis not substantially aligned with the outlet aperture.

14. The apparatus of claim 1, wherein the guide chamber comprises a collision cell enclosing the electrodynamic ion guide.

15. The apparatus of claim 14, further comprising a mass filter situated between the ionization chamber and the collision cell.

16. An electrodynamic ion guide comprising:

a first guide section for generating a first electrodynamic ion guiding field having a first generally longitudinal central field axis; and a second guide section longitudinally concatenated with the first guide section, for generating a second electrodynamic ion guiding field having a second generally longitudinal central field axis displaced from the first central field axis.

17. The ion guide of claim 16, wherein:

the first guide section comprises a first plurality of electrodes disposed symmetrically about a longitudinal, central geometric axis; and the second guide section comprises a second plurality of electrodes disposed symmetrically about the central geometric axis.

18. The ion guide of claim 17, wherein the first field axis substantially coincides with the central geometric axis.

19. The ion guide of claim 16, wherein:

the first guiding field has a quadrupole component; and the second guiding field is an asymmetric guiding field having a quadrupole component and a dipole component.

20. The ion guide of claim 19, wherein the first guiding field is a symmetric quadrupole field.

21. The ion guide of claim 16, further comprising:

a first voltage source coupled to the inlet guide section, for applying a first quadrupole voltage set to the inlet guide section to generate the first guiding field, wherein the first guiding field is a symmetric quadrupole field; and a second voltage source coupled to the outlet guide section, for applying a second voltage set to the outlet guide section, the second voltage set comprising a quadrupole component for generating a symmetric quadrupole field component of the second guiding field, and a dipole component for generating a dipole field component of the second guiding field.

22. The ion guide of claim 21, wherein the first voltage source comprises a pair of leads of a secondary inductor of a transformer, wherein a first lead of the pair of leads is commonly connected to a first pair of opposing electrodes of the inlet guide section, and a second lead of the pair of leads is commonly connected to a second pair of opposing electrodes of the inlet guide section.

23. The ion guide of claim 21, wherein the second voltage source comprises a first pair of leads of a secondary inductor of a first transformer, and a second pair of leads of a secondary inductor of a second transformer, wherein:

a first lead of the first pair of leads is commonly connected to a first pair of opposing electrodes of the outlet guide section, a second lead of the first pair of leads is connected to a center tap of the secondary inductor of the second transformer, a first lead of the second pair of leads is connected to a first electrode of a second pair of opposing electrodes of the outlet guide section, and a second lead of the second pair of leads is connected to a second electrode of the second pair of opposing electrodes of the outlet guide section.

24. The ion guide of claim 16, further comprising:

a first voltage source coupled to the first guide section, for applying a first, quadrupole voltage set to the first guide section to generate the first guiding field, wherein the first guiding field is a symmetric quadrupole field; and a second voltage source coupled to the second guide section, for applying a second voltage set to the second guide section, the second voltage set comprising a quadrupole component for generating a symmetric quadrupole field component of the second guiding field, and a dipole component for generating a dipole field component of the second guiding field.

25. The ion guide of claim 16, further comprising a driving DC voltage source coupled to at least one of the first guide section and the second guide section, for applying a driving DC voltage to at least part of the at least one of the first guide section and the second guide section to generate a longitudinal ion driving field.

26. The ion guide of claim 16, wherein the first guide section comprises a set of longitudinally-sequenced segments each comprising a plurality of conductive plates.

27. The ion guide of claim 16, wherein the first guide section comprises a plurality of generally-longitudinal rods.

28. The ion guide of claim 16, wherein the second guide section is positioned after the first guide section along an ion direction of motion, and the second guiding field is stronger than the first guiding field.

29. The ion guide of claim 16, wherein an internal guiding space of the ion guide narrows from a first end of the guide to a second end of the guide, the second guide being situated longitudinally opposite the first end.

30. The ion guide of claim 16, further comprising a third guide section longitudinally concatenated with the second guide section, for generating a third electrodynamic ion guiding field having a third generally longitudinal central field axis displaced from the first central field axis and the second central field axis.

31. The ion guide of claim 30, wherein the third guide section is disposed between the first guide section and the second guide section.

32. An electrodynamic ion guide for guiding ions into a mass analyzer, comprising:

a plurality of longitudinally concatenated quadrupole electrode segments for guiding the ions, wherein each of the plurality of electrode segments comprises a plurality of plate-shaped electrodes arranged symmetrically about a longitudinal central geometric axis of the guide; and a voltage source electrically connected to the plurality of electrode segments, for applying a first set of guiding voltages to a first subset of the plurality of segments, for generating a first guiding field having a first central field axis, and for applying a second set of guiding voltages to a second subset of the plurality of segments, for generating a second guiding field having a second central field axis displaced from the first central field axis.

33. The ion guide of claim 32, wherein:

the first guiding field is a symmetric quadrupole field, and the first central field axis substantially coincides with the central geometric axis; and the second guiding field has a symmetric quadrupole component and a dipole component.

34. A method of guiding ions to a mass analyzer, comprising:

inserting the ions into a guide chamber through an inlet aperture, substantially along a first field central axis of a first guiding field; and guiding the ions from the inlet aperture to an outlet aperture of the guide chamber through a generally-longitudinal multi-electrode ion guide situated within the guide chamber, the ion guide having an inlet region in proximity to the inlet aperture and an outlet region situated opposite the inlet region, the ion guide generating the first guiding field along the inlet region, and a second guiding field along the outlet region, and second guiding field having a second field central axis displaced from the first field central axis, the second field central axis being aligned with the outlet aperture.

* * * * *